United States Patent
Ishigaki

(10) Patent No.: US 6,932,111 B2
(45) Date of Patent: Aug. 23, 2005

(54) GATE VALVE APPARATUS

(75) Inventor: Tsuneo Ishigaki, Yawara-mura (JP)

(73) Assignee: SMC Corporation, Tokyo (JP)

( * ) Notice: Subject to any disclaimer, the term of this patent is extended or adjusted under 35 U.S.C. 154(b) by 33 days.

(21) Appl. No.: 10/807,790

(22) Filed: Mar. 24, 2004

(65) Prior Publication Data

US 2004/0200534 A1 Oct. 14, 2004

(30) Foreign Application Priority Data

Mar. 24, 2003 (JP) ........................................ 2003-079318

(51) Int. Cl.$^7$ ............................................... F17D 1/00
(52) U.S. Cl. ........................ 137/613; 251/326; 251/301
(58) Field of Search .......................... 137/613; 251/301, 251/326, 215, 251, 229

(56) References Cited

U.S. PATENT DOCUMENTS 3,973,753 A * 8/1976 Wheeler ...................... 251/301
6,089,537 A * 7/2000 Olmsted ...................... 251/251
6,464,203 B1 * 10/2002 Ishigaki et al. ............. 251/326

* cited by examiner

Primary Examiner—Kevin Lee
(74) Attorney, Agent, or Firm—Baker Botts LLP

(57) ABSTRACT

A gate valve apparatus minimizes the chance that radicals and plasma in exhaust gas will contact a main valve seal, thereby preventing deterioration of the main valve seal. Slats of a flow control device are installed in an exhaust flow path to control the pressure in a process chamber. The main valve seal is provided on an abutting surface of a main valve element. An annular projection is provided on a pump-side inner wall surface of an accommodating chamber. When it is in a non-sealing position, the main valve element is moved toward the pump-side inner wall surface of the accommodating chamber to bring an outer peripheral portion of the main valve element into contact with the annular projection. Thus, the main valve seal is shielded from radicals and plasma in exhaust gas by the main valve element, the annular projection and the pump-side inner wall surface of the accommodating chamber. A shielding ring may be secured to an outer peripheral portion of the main valve element radially outward of the main valve seal instead of using the annular projection.

12 Claims, 8 Drawing Sheets

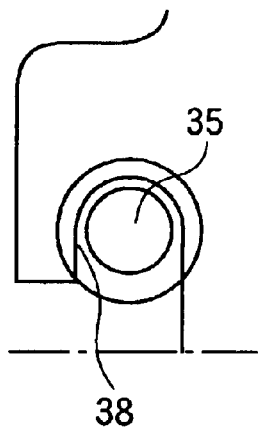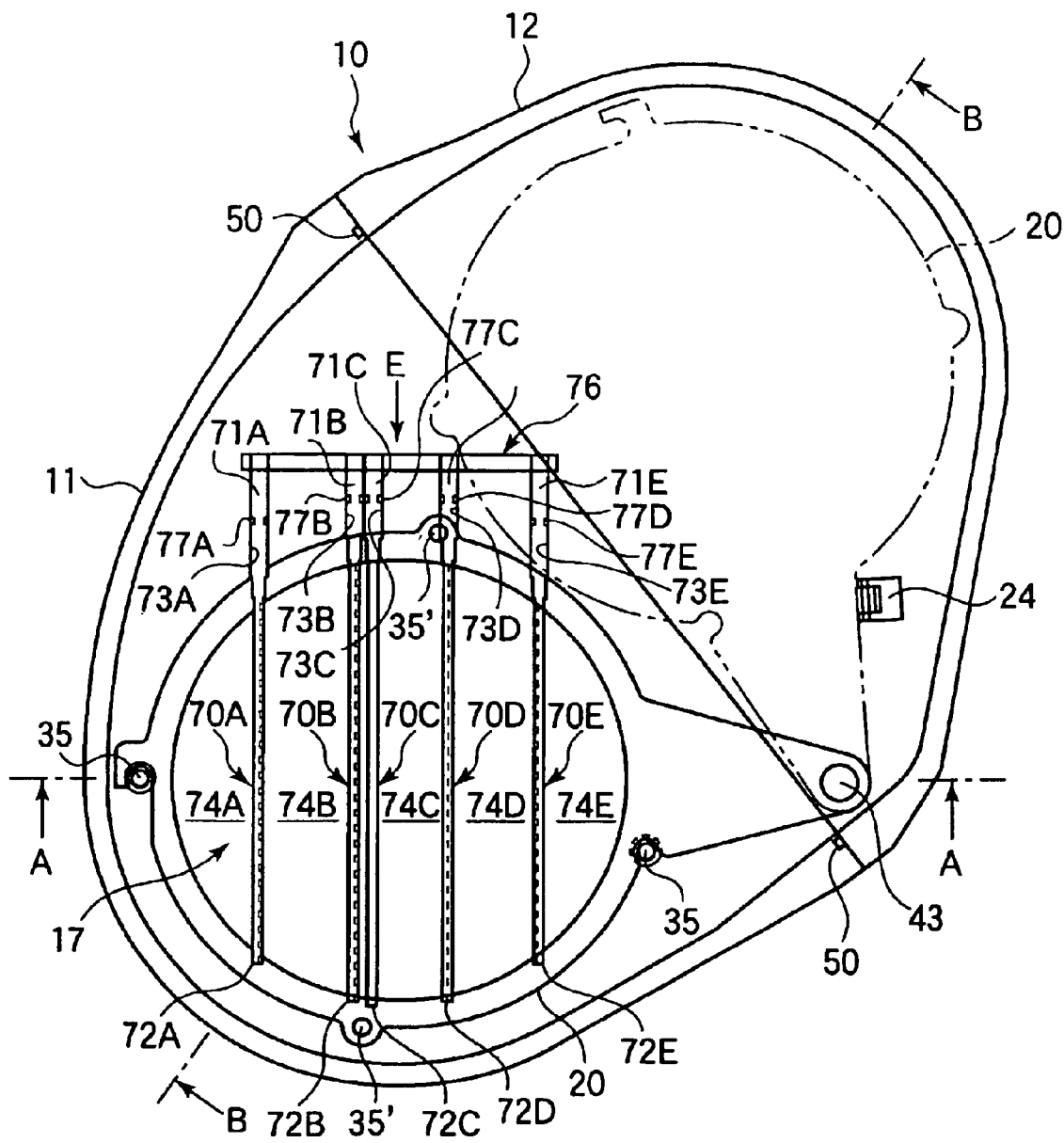

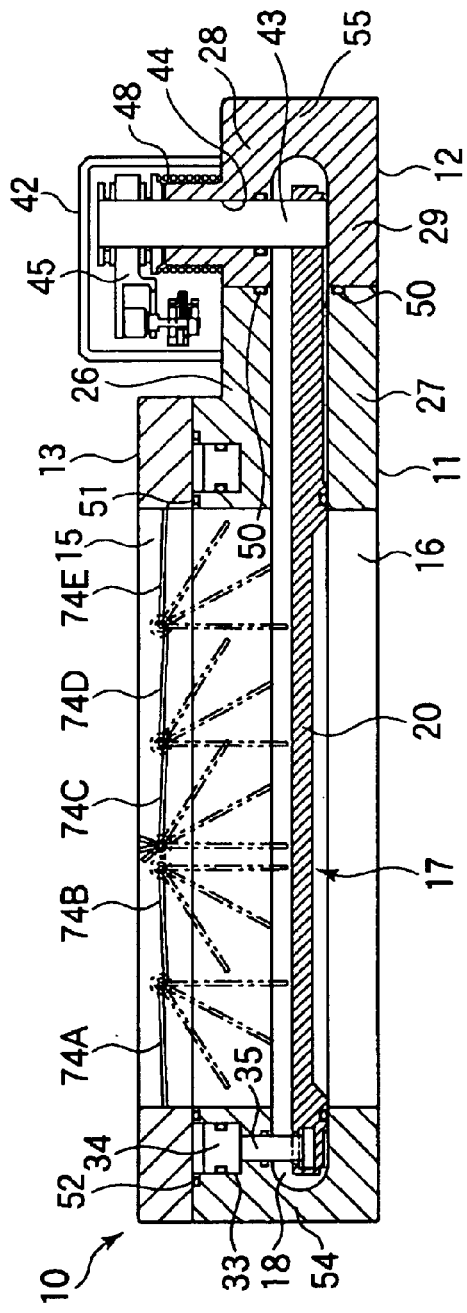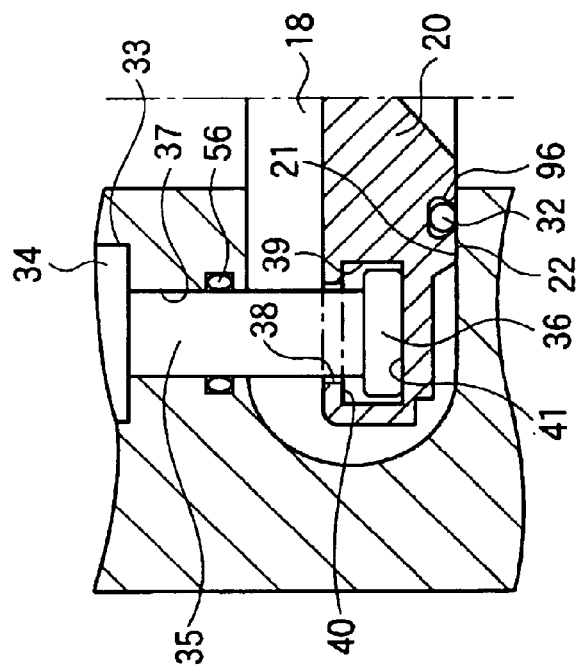

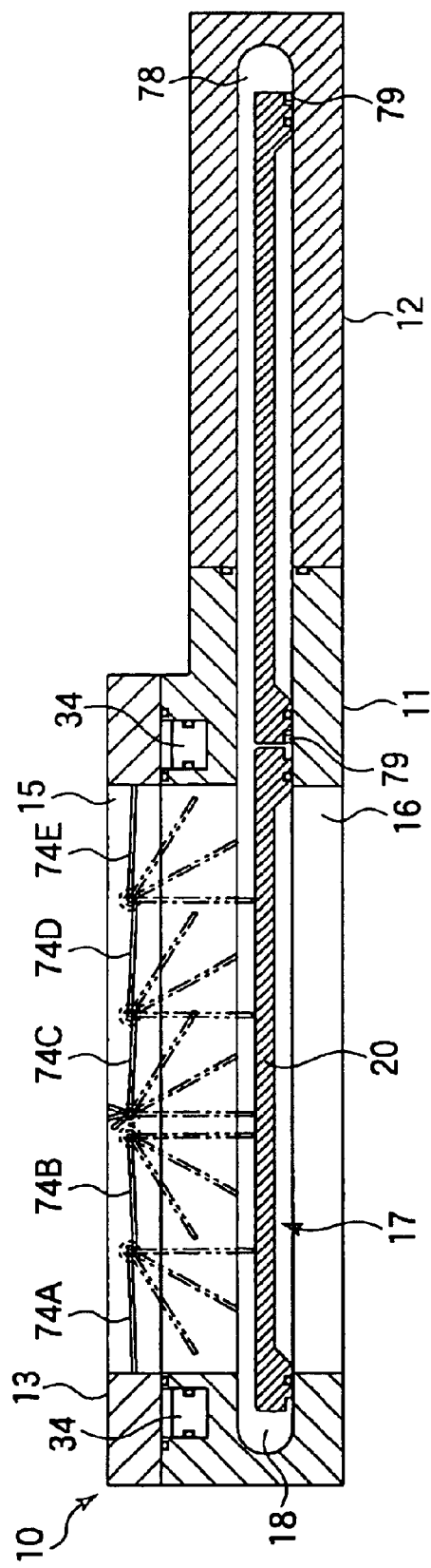
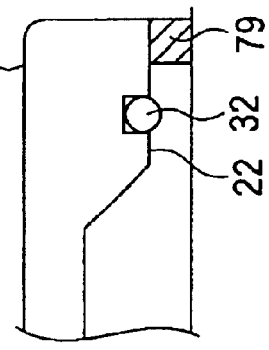
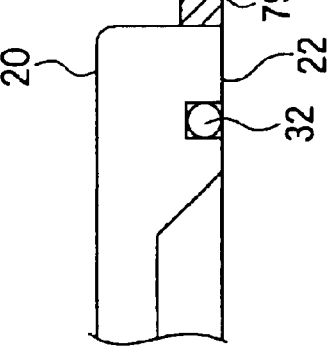
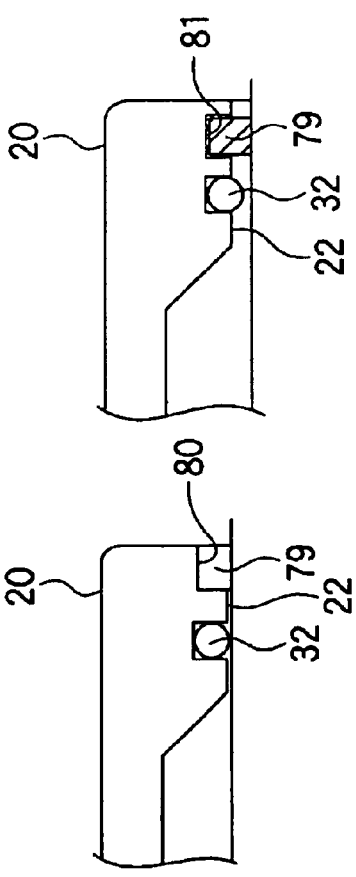
FIG.3A
FIG.3B FIG.3C FIG.3D FIG.3E

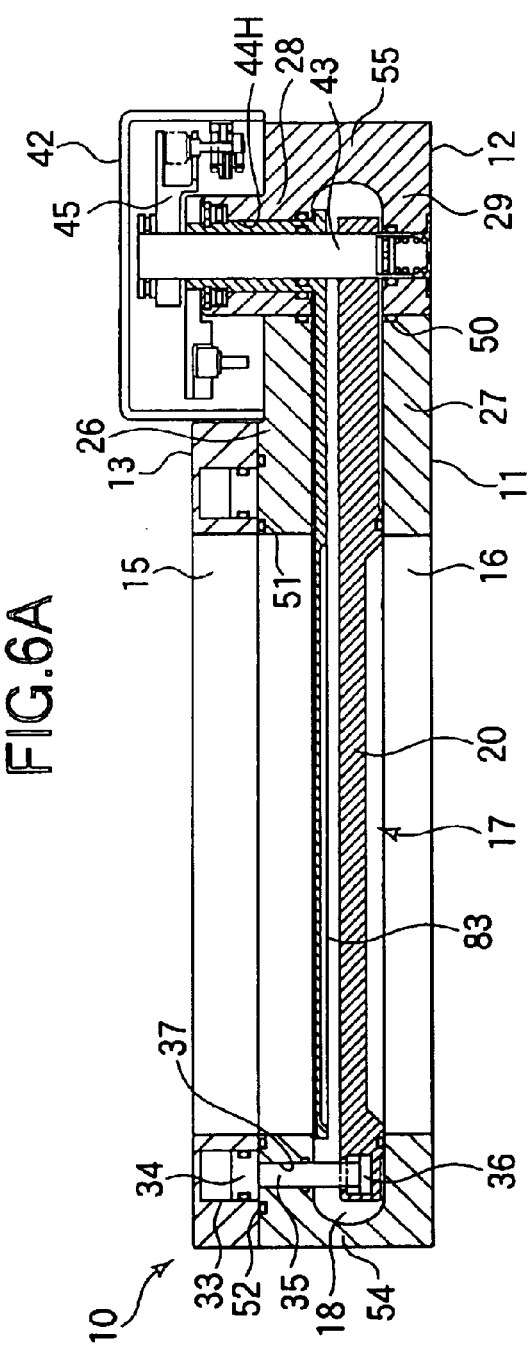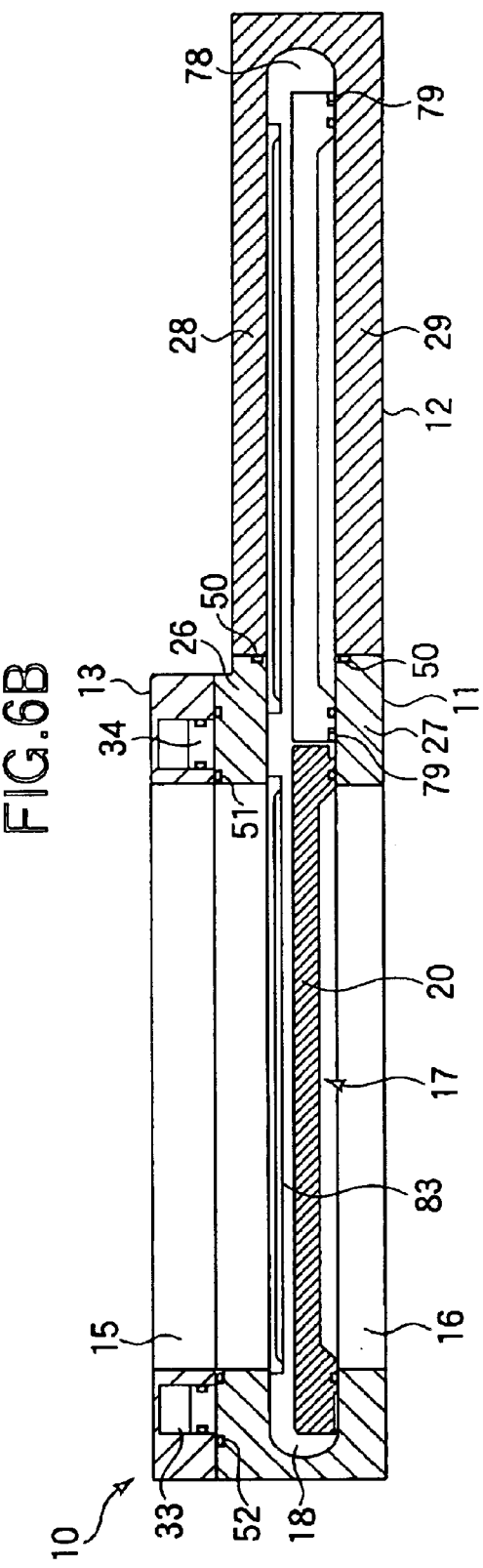

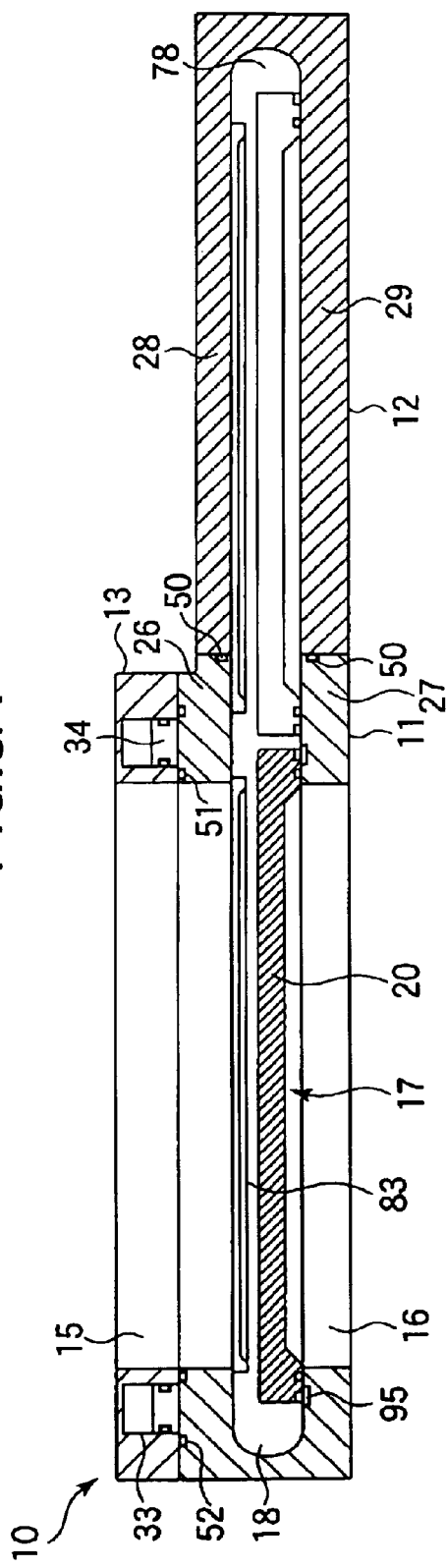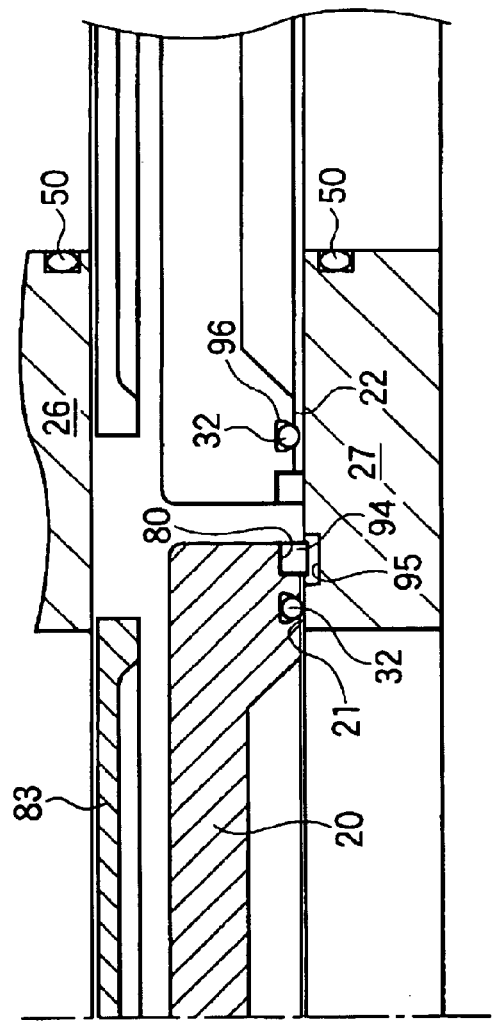

GATE VALVE APPARATUS

BACKGROUND OF THE INVENTION

1. Field of the Invention

The present invention relates to a gate valve apparatus provided between a vacuum chamber and an evacuation pump in a semiconductor manufacturing system, etc.

2. Description of the Related Art

A patent document 1 [Japanese Patent Application Unexamined Publication (KOKAI) No. Hei 9-178000] discloses a slide valve (gate valve) including a housing formed of an upper housing part and a lower housing part that are connected and secured to each other along a separation plane. The lower housing part is formed with a straight exhaust flow path (exhaust passage) for providing communication between an inlet port and an outlet port. A slide plate (valve element) is provided so as to be movable (rectilinearly or pivotally) in a direction perpendicular to the center axis of the exhaust flow path. The movement of the slide plate is effected by a servomotor. The flow rate through the exhaust flow path is controlled by the movement of the slide plate. In the lower housing part, an annular seal ring is provided parallel to the slide plate so as to surround the exhaust flow path. An annular projection is formed on the inner peripheral portion of the seal ring. A first O-ring is disposed in an annular groove provided in a surface of the seal ring located adjacent to the slide plate. A second O-ring is provided on the outer peripheral surface of the annular projection and abuts the inner wall surface of the exhaust flow path.

The gate valve as provided between a vacuum chamber and an evacuation pump operates as follows. When the vacuum chamber is subjected to maintenance (e.g. repair, replacement, cleaning, etc. of component parts), the main valve (comprising the slide plate and the valve seat) is fully closed to bring the pressure in the vacuum chamber to the atmospheric pressure while the vacuum pump is being driven continuously. To carry out film deposition, etching or cleaning, the opening of the main valve is adjusted to control the flow rate for the purpose of controlling the pressure in the vacuum chamber, and the vacuum pump is driven. The first O-ring and the second O-ring are exposed to exhaust gas (containing plasma and radicals) in the exhaust flow path no matter which position the main valve is in, i.e. fully closed position, fully open position, or intermediate position.

In vacuum process chambers of semiconductor manufacturing systems and the like, many methods of decomposing compounds by plasma are used for film deposition, etching, cleaning, etc. Decomposition of a compound by plasma produces radicals (free radicals and atoms having unpaired electrons). The radicals have heat energy and exhibit very high reactivity. Even if they collide against the wall surface of the vacuum chamber several times, the radicals are unlikely to lose their energy. Consequently, the radicals in the exhaust gas decompose and deteriorate polymerized sealing materials such as packings.

Regarding the plasma resistance of seals, if the seals are located at a position where they cannot directly be viewed from the plasma source, deterioration due to plasma of high energy can be prevented to a certain extent because ionized atoms lose the electric charge by collision in the chamber. Accordingly, the influence of the plasma reduces. However, deterioration cannot completely be prevented. The seals are subjected to radicals, which do not readily degrade, in addition to the plasma. Therefore, the deterioration of the seals is a serious problem.

Among seals, a sealing material used in a static sealed portion of a vacuum chamber, etc. is fitted in a seal groove formed in a wall surface of a metal or the like. In order to reach the sealing material, plasma and radicals need to move several millimeters along the metal or other wall surface through a gap of several tens of microns. During the movement, the plasma and radicals lose their energy. Accordingly, the deterioration of the sealing material is reduced.

However, a sealing material of a gate valve used in an exhaust system is located in close proximity to an exhaust gas passage and hence exposed in the midst of radicals having intense reactivity and plasma having a certain level of energy. Therefore, the lifetime of the sealing material is reduced considerably.

One generation ago, fluororubber (FKM) was used as a sealing material for gate valves of apparatuses using plasma. However, at present it has become common practice to use fully fluorinated rubber (perfluoroelastomer: FFKM), which has improved resistance to plasma and radicals, as a sealing material for gate valves in order to cope with the present situation that the energy of plasma and radicals has increased to a high level. Even if fully fluorinated rubber is used, the sealing material is deteriorated by plasma and radicals. It is necessary to replace the deteriorated sealing material once two or three months, depending on the circumstances. The cost of sealing materials is as follows. Assuming that the cost of nitrile-butadiene rubber (NBR) is 1, the cost of fluororubber is from 10 to 20, and the cost of fully fluorinated rubber is from 100 to 200. Thus, it costs a great deal to replace the ultra-costly sealing material of fully fluorinated rubber, and a great deal of loss is caused by suspension of the apparatus due to replacement.

SUMMARY OF THE INVENTION

A first object of the present invention is to provide a gate valve apparatus arranged to minimize the chance that radicals and plasma in exhaust gas will contact a main valve seal, thereby preventing deterioration of the main valve seal.

A second object of the present invention is to provide a gate valve apparatus including a main valve having a main valve seal provided on a main valve element, wherein when the main valve is not fully closed (not in a full blocking position), the main valve element is moved to a shielded position where it is isolated and shielded from the exhaust flow path, and the flow rate through the exhaust flow path is controlled by a device other than the main valve to control the pressure in the process chamber, thereby preventing the exhaust gas from contacting the main valve seal.

To attain the above-described objects, the present invention is applied to a gate valve apparatus including a valve body having a rectilinear exhaust flow path formed therein to extend from a chamber port to a pump port. A main valve is provided in the valve body. The main valve includes a main valve element and a main valve seat. The main valve element is movable within a travel space in a direction parallel to the axis of the exhaust flow path. When the main valve element is in a sealing position, a main valve seal for the main valve element contacts the main valve seat to block communication through the exhaust flow path. When it is in a non-sealing position, the main valve element is separated from the main valve seat by a predetermined distance and moved (pivotally or rectilinearly) in a direction perpendicular to the axis of the exhaust flow path so as to be accommodated in an accommodating chamber.

According to a first arrangement of the present invention, the main valve seal is provided on an abutting surface of the main valve element, and an annular projection is provided on an inner wall surface (e.g. pump-side inner wall surface) of the accommodating chamber. When it is in the non-sealing position, the main valve element is moved toward the inner wall surface (e.g. pump-side inner wall surface) of the accommodating chamber to bring an outer peripheral portion of the main valve element into contact (or close contact) with the annular projection, whereby the main valve seal is shielded from radicals and plasma in exhaust gas by the main valve element, the annular projection and the inner wall surface (e.g. pump-side inner wall surface) of the accommodating chamber.

According to a second arrangement of the present invention, an annular groove or an annular cut portion is formed on an outer peripheral portion of the abutting surface of the main valve element radially outward of the main valve seal in the first arrangement. The annular projection is fitted (closely) into the annular groove or the annular cut portion when the main valve seal is in the shielded position.

According to a third arrangement of the present invention, when the main valve seal is in the shielded position in the first arrangement, the outer peripheral surface of the main valve element is fitted (closely) to the inner peripheral surface of the annular projection.

According to a fourth arrangement of the present invention, when the main valve seal is in the shielded position in the first arrangement, an outer peripheral portion of the abutting surface of the main valve element that is radially outward of the main valve seal is abutted (closely) against the annular projection.

In addition, the present invention is applied to a gate valve apparatus including a valve body having a rectilinear exhaust flow path formed therein to extend from a chamber port to a pump port. A main valve is provided in the valve body. The main valve includes a main valve element and a main valve seat. The main valve element is movable within a travel space in a direction parallel to the axis of the exhaust flow path. When the main valve element is in a sealing position, a main valve seal for the main valve element contacts the main valve seat to block communication through the exhaust flow path. When it is in a non-sealing position, the main valve element is separated from the main valve seat by a predetermined distance and moved in a direction perpendicular to the axis of the exhaust flow path so as to be accommodated in an accommodating chamber.

According to a fifth arrangement of the present invention, the main valve seal is provided on an abutting surface of the main valve element, and a shielding ring is secured to an outer peripheral portion of the abutting surface of the main valve element that is radially outward of the main valve seal. Further, an annular groove is formed on the main valve seat. When the main valve element is in the sealing position, the shielding ring is positioned in the annular groove, and the main valve seal contacts the main valve seat. When it is in the non-sealing position, the main valve element is separated from the main valve seat by a predetermined distance and moved toward an inner wall surface of the accommodating chamber to bring the shielding ring into contact with the inner wall surface of the accommodating chamber, whereby the main valve seal is shielded from radicals and plasma in exhaust gas by the main valve element, the shielding ring and the inner wall surface of the accommodating chamber.

According to a sixth arrangement of the present invention, the gate valve apparatus according to any of the first to fifth arrangements further includes a plurality of rotary resistance valve elements having slats on respective rotating shafts that are rotatably provided in the exhaust flow path to extend in a direction perpendicular to the axis of the exhaust flow path. The flow rate through the exhaust flow path is controlled by varying the angle of the slats of the rotary resistance valve elements.

According to a seventh arrangement of the present invention, the gate valve apparatus according to any of the first to fifth arrangements is arranged as follows. The rotating shafts of the rotary resistance valve elements are disposed parallel to each other, and a pinion is secured to one end of each rotating shaft. The pinions on the rotating shafts of the rotary resistance valve elements are meshed with a compound rack. Some of the pinions are meshed at one side thereof with the compound rack. The rest of the pinions are meshed at the other side thereof with the compound rack. Consequently, the some of the pinions and the rest of the pinions rotate in opposite directions to each other in response to the reciprocating motion of the compound rack.

According to an eighth arrangement of the present invention, the gate valve apparatus according to any of the first to fifth arrangements is arranged as follows. A slide resistance valve element is provided in the travel space at a predetermined distance from the main valve element (approximately in parallel to the main valve element). The slide resistance valve element is movable (pivotally or rectilinearly) in a direction perpendicular to the axis of the exhaust flow path. The flow rate through the exhaust flow path is controlled by movement of the slide resistance valve element in the direction perpendicular to the axis of the exhaust flow path.

According to a ninth arrangement of the present invention, the gate valve apparatus according to the sixth or seventh arrangement further includes a heater installed near the pinions of the rotating shafts to prevent adhesion of a by-product to the slats of the rotary resistance valve elements.

According to a tenth arrangement of the present invention, the reciprocating motion of the compound rack in the seventh arrangement is performed by a cylinder device using a metal bellows.

According to an eleventh arrangement of the present invention, a metal bellows is used as an actuator for moving the slide resistance valve element in the direction perpendicular to the axis of the exhaust flow path in the eighth arrangement.

In addition, the present invention is applied to a gate valve apparatus including a valve body having a rectilinear exhaust flow path formed therein to extend from a chamber port to a pump port. A main valve is provided in the valve body. The main valve includes a main valve element and a main valve seat. The main valve element is movable within a travel space in a direction parallel to the axis of the exhaust flow path. When the main valve element is in a sealing position, a main valve seal for the main valve element contacts the main valve seat to block communication through the exhaust flow path. When it is in a non-sealing position, the main valve element is separated from the main valve seat by a predetermined distance and moved in a direction perpendicular to the axis of the exhaust flow path so as to be accommodated in an accommodating chamber.

According to a twelfth arrangement of the present invention, the main valve seal is provided on an abutting surface of the main valve element. When it is in the non-sealing position, the main valve element is moved toward an inner wall surface of the accommodating chamber and further moved in a direction parallel to the axis of the exhaust flow path so as to be pressed against the inner wall surface of the accommodating chamber, whereby a pressing surface of the main valve element is shielded from plasma.

The gate valve apparatus according to the first to fifth and eighth arrangements minimize the chance that radicals and plasma in the exhaust gas will contact the main valve seal, thereby preventing deterioration of the main valve seal. That is, when the main valve is not fully closed (i.e. when the main valve element is in the non-sealing position), the flow rate through the exhaust flow path is controlled by a device other than the main valve to control the pressure in the process chamber, and the main valve element moves to a shielded position where the main valve seal is isolated and shielded from the exhaust flow path. Thus, the main valve seal is prevented from contacting the radicals and plasma in the exhaust gas. Therefore, the lifetime of the main valve seal increases markedly. Accordingly, a maintenance-free main valve seal is attained, and the cost of replacing the main valve seal is reduced. Moreover, the achievement of a maintenance-free main valve seal eliminates the need for time spent for maintenance of the apparatus. Accordingly, there will be no loss otherwise caused by suspension of the operation of the semiconductor manufacturing system for the period of time required for maintenance. Further, because there is no attack on the main valve seal by radicals or plasma, there is no possibility that a decomposition product of the main valve seal may flow backward into the process chamber to contaminate the work, which has heretofore been experienced.

The gate valve apparatus according to the sixth and seventh arrangements allow the rotary resistance valve elements to be controlled over the entire area of a perpendicular cross-section of the exhaust flow path. Therefore, there is no pressure nonuniformity at the work in the process chamber communicating with the exhaust flow path. Accordingly, the work is processed uniformly. Thus, the performance of the finished product is improved.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1A is a front explanatory view of a gate valve apparatus according to a first embodiment of the present invention.

FIG. 1B is a fragmentary enlarged view of an essential part of FIG. 1A.

FIG. 2A is a sectional view as seen from the direction of the arrow A—A in FIG. 1A.

FIG. 2B is a fragmentary enlarged view of an essential part of FIG. 2A.

FIG. 3A is a sectional view as seen from the direction of the arrow B—B in FIG. 1A.

FIG. 3B is a fragmentary enlarged view of an essential part of FIG. 3A.

FIGS. 3C to 3E are fragmentary enlarged views showing modifications of the arrangement shown in FIG. 3B.

FIG. 6A is a sectional view as seen from the direction of the arrow C—C in FIG. 5.

FIG. 6B is a sectional view as seen from the direction of the arrow D—D in FIG. 5.

FIG. 8A is a sectional view corresponding to FIG. 6B, showing a modification of the second embodiment.

FIG. 8B is a fragmentary enlarged view of an essential part of FIG. 8A.

DETAILED DESCRIPTION OF THE PREFERRED EMBODIMENTS

Figure 4A:
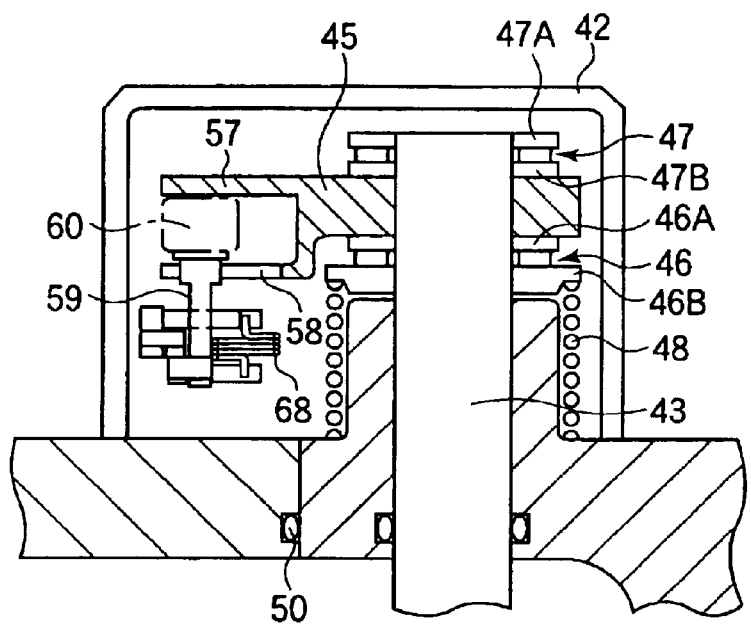
FIG. 4A is a fragmentary enlarged view of another essential part of FIG. 2A.

FIGS. 1A to 4D show a first embodiment of the gate valve apparatus according to the present invention. As shown in FIGS. 2A and 2B, a valve body 10 comprises a valve body member 11, a valve bonnet 12 and a flange 13. The valve body 10 has a rectilinear exhaust flow path 17 extending from a chamber port 15 provided at the process chamber side (upper side in FIG. 2A) to a pump port 16 provided at the pump side (lower side as viewed in FIG. 2A). The valve body 10 further has a travel space 18 for a main valve element 20 that is movable in directions parallel and perpendicular to the axis of the exhaust flow path 17. The valve body member 11 has a chamber-side side wall 26 and a pump-side side wall 27 that are connected together by a left wall 54 in FIG. 2A. The valve bonnet-side end surfaces of the side walls 26 and 27 are connected with side walls 28 and 29 of the valve bonnet 12 through bonnet seals 50, respectively. The valve body member 11 and the valve bonnet 12 are secured to each other with bolts (not shown). The side walls 28 and 29 of the valve bonnet 12 are connected together by a right wall 55 in FIG. 2A. An annular flange 13 is secured to the surface of the chamber-side side wall 26 of the valve body member 11 with a plurality of bolts (not shown). The chamber port 15 of the flange 13 and the exhaust flow path 17 of the valve body member 11 have the same diameter and are disposed on the same axis.

As shown in FIGS. 2A and 2B, an annular main valve seat 21 is formed on the inner side (upper side in the figures) of the pump-side wall 27 of the valve body member 11 at the peripheral edge of the pump port 16. An annular abutting surface 22 is formed on the pump-side surface of the main valve element 20. A main valve seal 32 is fitted in an annular fitting groove 96 formed in the abutting surface 22. The main valve element 20 and the main valve seat 21 constitute a main valve. When the main valve element 20 is in a sealing position, the main valve seal 32 of the main valve element 20 is concentric with respect to the main valve seat 21 and in close contact with the main valve seat 21 to block communication through the exhaust flow path 17.

An annular cylinder chamber 33 is formed in the side wall 26 of the valve body member 11 radially outward of the exhaust flow path 17. The process chamber-side end of the annular cylinder chamber 33 is open. The inner surface of the flange 13 is abutted on the process chamber-side end of the annular cylinder chamber 33. Annular grooves are formed on the process chamber-side surface of the side wall 26 at respective positions that are inside and outside the annular cylinder chamber 33. An inner seal 51 and an outer seal 52 are fitted in the annular grooves, respectively. The seals 51 and 52 hermetically seal between the side wall 26 and the flange 13.

An annular piston 34 is slidably fitted in the annular cylinder chamber 33. A plurality (e.g. two) of piston shafts 35 (see also FIGS. 1A and 1B) are secured to the pump-side end of the annular piston 34. As shown in FIG. 2B, each piston shaft 35 extends into the travel space 18 through an insertion hole 37 in the side wall 26. A collar 36 with a circular sectional configuration is secured to the distal end of the piston shaft 35. An annular groove is formed in the inner wall surface of the insertion hole 37. A seal 56 is provided in the annular groove to hermetically seal between the piston shaft 35 and the insertion hole 37. In FIGS. 1A and 1B, a groove 38 with a U-shape as seen in a front view is formed in a lower side portion of the main valve element 20, and a rectangular hole 39 is formed adjacently to the groove 38 at the lower side of the groove 38 as seen in the sectional side view of FIG. 2B. The upper end wall of the rectangular hole 39 as seen in the sectional side view of FIG. 2B forms an abutting portion 40, and the lower end wall of the rectangular hole 39 forms a retaining portion 41. When the main valve element 20 is in a sealing position (FIGS. 1A to 2B), the piston shafts 35 are inserted into the respective grooves 38, and the lower end surface of the collar 36 of each piston shaft 35 is pressing the retaining portion 41 of the main valve element 20. It should be noted that a piston shaft having no collar 36 may be used to press against the upper surface of the main valve element 20 directly.

The center of pivotal motion of the main valve element 20 is located in the travel space 18 within the valve bonnet 12. The main valve element 20 is secured to a pivot shaft 43 at the center of pivotal motion. The pivot shaft 43 is inserted through an insertion hole 44 in the side wall 28 of the valve bonnet 12 to project from the process chamber side of the valve bonnet 12. As shown in FIGS. 2A and 4A, the pivot shaft 43 is fitted into and secured to a through-hole formed in one end portion of a pivoting arm 45. The pivot shaft 43 is provided with a first thrust ball bearing 46 and a second thrust ball bearing 47 at the lower and upper sides, respectively, of the one end portion of the pivoting arm 45. An outer ring (upper ring) 46A of the first thrust ball bearing 46 and an outer ring (lower ring) 47B of the second thrust ball bearing 47 are abutted on the one end portion of the pivoting arm 45. An inner ring (lower ring) 46B of the first thrust ball bearing 46 and an inner ring (upper ring) 47A of the second thrust ball bearing 47 are connected to the pivot shaft 43. A spring 48 is provided between the inner ring 46B of the first thrust ball bearing 46 and the chamber-side surface of the side wall 28. Resilient force from the spring 48 urges the first thrust ball bearing 46, the pivoting arm 45 and the second thrust ball bearing 47 away from the valve body 10. In the initial position, the main valve element 20 is held away from the main valve seat 21 by a predetermined distance by the resilient force of the spring 48.

Figure 4B:
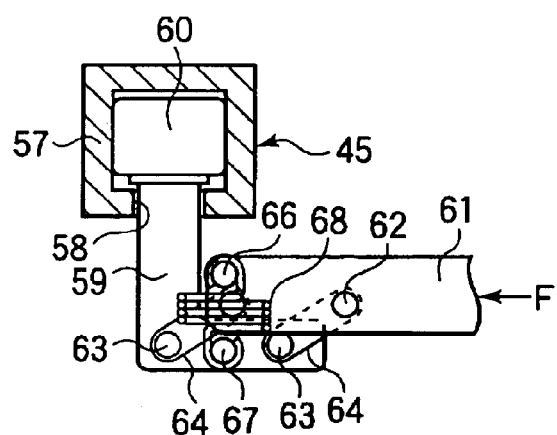
FIG. 4B is a fragmentary enlarged view of an essential part of FIG. 4A as seen from the left-hand side thereof (when the valve seal is in a non-shielded position).
Figure 4C:
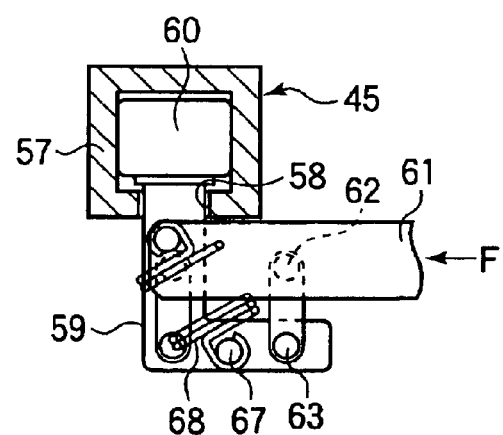
FIG. 4C is a fragmentary enlarged view of an essential part of FIG. 4A as seen from the left-hand side thereof (when the valve seal is in a shielded position).

As shown in FIGS. 4A to 4C, a quadrangular frame 57 is formed at the other end of the pivoting arm 45. An insertion groove 58 is formed in the lower wall of the frame 57. An upper end portion of a vertically elongated portion of an L-shaped arm 59 is inserted in the insertion groove 58. A rotating wheel 60 is fitted to the upper end of the vertically elongated portion of the L-shaped arm 59 through a roller bearing. The rotating wheel 60 is disposed inside the frame 57 in engagement with the inner side wall of the frame 57.

One end portion of a propelling shaft 61 is disposed parallel to a horizontally elongated portion of the L-shaped arm 59. The propelling shaft 61 has two link pins 62 projecting from a side surface of the one end portion thereof. The L-shaped arm 59 also has two link pins 63 projecting from a side surface of the horizontally elongated portion thereof. Each link plate 64 has engagement holes respectively formed in both end portions thereof. One link pin 62 is engaged with one engagement hole of the link plate 64. One link pin 63 is engaged with the other engagement hole of the link plate 64. The propelling shaft 61 has one spring pin 66 projecting from the side surface of the one end portion thereof. The L-shaped arm 59 also has one spring pin 67 projecting from the side surface of the horizontally elongated portion thereof. A tension spring 68 is provided between the pins 66 and 67. When no external force acts on the propelling shaft 61, the link plates 64 are tilted as shown in FIG. 4B by the tensile force of the tension spring 68. It should be noted that the pivoting arm 45, the propelling shaft 61, etc. are covered with a cover 42 having a stopper function.

In FIG. 3A, the main valve element 20 that is in the sealing position is illustrated in the left half of the travel space 18. In the right half (accommodating chamber 78) of the travel space 18, the main valve element 20 is illustrated as being in a shielded position where the main valve seal 32 is isolated and shielded from exhaust gas flowing through the exhaust flow path 17.

Next, a mechanism for shielding the main valve seal 32 from the exhaust gas will be described. An annular projection 79 is provided on the pump-side inner wall surface of the accommodating chamber 78. When the main valve element 20 is in a non-sealing position and concentric with respect to the annular projection 79 in the accommodating chamber 78, the main valve element 20 is moved toward the pump-side inner wall surface of the accommodating chamber 78, so that the outer peripheral portion of the main valve element 20 comes in contact (may come in close contact) with the annular projection 79. The pressure in the exhaust flow path 17 of the gate valve apparatus in the semiconductor manufacturing system is usually between several millitorr and several tens of millitorr, and the mean free path of plasma and radicals in the exhaust gas is several centimeters. Therefore, the main valve seal 32 is shielded from harmful components (plasma and radicals) in the exhaust gas when it is surrounded by the main valve element 20, the annular projection 79 and the pump-side inner wall surface of the accommodating chamber 78.

FIGS. 3A to 3E show four different modes in which the outer peripheral portion of the main valve element 20 contacts the annular projection 79. In FIG. 3B, the main valve element 20 has an annular cut portion 80 formed on the abutting surface 22 at a position closer to the outer periphery of the main valve element 20 than the main valve seal 32 (i.e. radially outward of the main valve seal 32). The annular projection 79 is fitted in the annular cut portion 80 (in close contact with it). In FIG. 3C, the main valve element 20 has an annular groove 81 formed on the abutting surface 22 radially outward of the main valve seal 32. The annular projection 79 is fitted in the annular groove 81 (in close contact with it). In FIG. 3D, the inner peripheral surface of the annular projection 79 is in contact with the outer peripheral surface of the main valve element 20. In FIG. 3E, the annular projection 79 is in contact with a portion of the abutting surface 22 of the main valve element 20 radically outward of the main valve seal 32. It should be noted that the above-described contact and fitting portions are preferably provided with a sheet of fluorocarbon resin or the like.

Figure 4D:
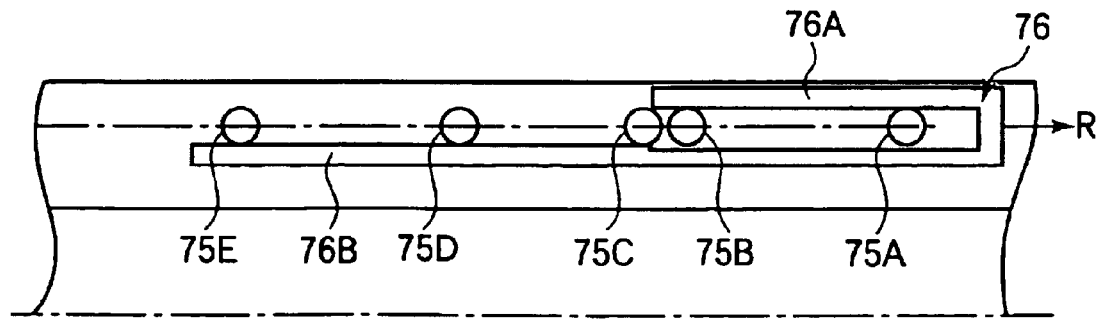
FIG. 4D is a fragmentary view as seen from the direction of the arrow E in FIG. 1A.

A flow control mechanism (louver type) according to the first embodiment that uses rotary resistance valve elements 70 will be described below with reference to FIGS. 1A, 2A and 4D. Rotating shafts 71A to 71E of a plurality of rotary resistance valve elements 70A to 70E are disposed parallel to each other to extend in a direction (preferably in a plane) perpendicular to the axis of the exhaust flow path 17. The rotating shafts 71A to 71E each have a large-diameter portion and a small-diameter portion. The distal ends of the small-diameter portions of the rotating shafts 71A to 71E are rotatably supported by respective support holes (blind holes) 72A to 72E in the flange 13. The large-diameter portions of the rotating shafts 71A to 71E are inserted into respective insertion holes 73A to 73E in the flange 13. The proximal ends of the large-diameter portions of the rotating shafts 71A to 71E project to the outside (atmospheric air) of the valve body 10. The gaps between the large-diameter portions of the rotating shafts 71A to 71E and the insertion holes 73A to 73E of the flange 13 are hermetically sealed with respective external seals 77A to 77E to prevent the atmospheric air from flowing into the exhaust flow path 17. It should be noted that a heater may be provided for the rotary resistance valve elements 70 or the rotating shafts 71 to prevent adhesion of a by-product to the rotary resistance valve elements 70.

Slats 74A to 74E having configurations as shown in FIG. 1A are secured to the rotary resistance valve elements 70A to 70E, respectively. As the rotating shafts 71A to 71E are rotated, the slats 74A to 74E are pivoted, whereby the pressure in the process chamber is controlled to a predetermined pressure. Pinions 75A to 75E are secured to the respective proximal ends (one ends) of the large-diameter portions of the rotating shafts 71A to 71E. The pinions 75A to 75E are in mesh with a compound rack 76. In FIG. 4D, the compound rack 76 has a rack portion 76A that meshes with only the upper side (one side surface) of a pinion 75. The compound rack 76 further has a rack portion 76B that meshes with only the lower side (the other side surface) of a pinion 75. The pinions 75A and 75B are each in mesh with only the rack portion 76A at the upper side thereof. The pinions 75C to 75E are each in mesh with only the rack portion 76B at the lower side thereof. Accordingly, if the compound rack 76 is moved in the direction of the arrow R in FIG. 4D by an actuator (not shown), the pinions 75A and 75B rotate clockwise (in the right-hand direction) through about 90 degrees at maximum, while the pinions 75C to 75E rotate counterclockwise (in the left-hand direction) through about 90 degrees at maximum. As actuators for moving the compound rack 76 and the pivoting arm 45 (propelling shaft 61), it is possible to use a low-sliding metal cylinder device, a non-sliding cylinder device utilizing expansion and contraction of a bellows (e.g. a metal bellows), or a linear motor. In FIG. 2A, the horizontal position (solid-line position) of the slats 74A to 74E is a maximum resistance (minimum flow rate) position, and the vertical position of the slats 74A to 74E is a minimum resistance (maximum flow rate) position.

The operation of the first embodiment will be described below. FIGS. 1A and 2A show a state where the main valve element 20 is in the sealing position. The head-side cylinder chamber portion (upper cylinder chamber portion in FIG. 1A) of the annular cylinder chamber 33 is supplied with compressed air, causing the annular piston 34 to be pushed down by the force for advancing the annular piston 34 against the urging force of the spring 48. The collars 36 of the piston shafts 35 press against the retaining portion 41 of the main valve element 20, causing the main valve seal 32 to be pressed against the main valve seat 21. Thus, communication through the exhaust flow path 17 is blocked.

Next, an operation of moving the main valve element 20 from the sealing position to the non-sealing position and further moving the main valve element 20 to the position where the main valve seal 32 is shielded. First, the compressed air in the head-side cylinder chamber portion of the annular cylinder chamber 33 is released to the atmosphere. Consequently, the urging force of the spring 48 is allowed to act on the main valve element 20, and if necessary, compressed air is supplied to the rod-side cylinder chamber portion (lower cylinder chamber portion in FIG. 1A) of the annular cylinder chamber 33, thereby applying force for retraction to the annular piston 34. Consequently, the upper end surface of the collar 36 of each piston shaft 35 and the abutting portion 40 abut against each other. Then, the pivot shaft 43 and the main valve element 20 begin to move toward the process chamber side (upward in FIG. 1A) in parallel to the axis of the exhaust flow path 17 against the fixing force acting between the main valve seal 32 of the main valve element 20 and the main valve seat 21. When the upper end surface of the second thrust ball bearing 47 at the upper end of the pivot shaft 43 abuts against the cover 42, the movement of the main valve element 20 stops, and the main valve element 20 is located in this position. At this time, the positional relationship between the propelling shaft 61 and the L-shaped arm 59 is as shown in FIG. 4B.

When force is applied to the propelling shaft 61 in the direction of the arrow F by the actuator (actuator for pivotal motion, not shown) at the other end of the propelling shaft 61, the main valve element 20 begins to pivot clockwise in FIG. 1A about the pivot shaft 43 while the tension spring 68 is maintaining the shape shown in FIG. 4B. The grooves 38 and the rectangular holes 39 of the main valve element 20 disengage from the piston shafts 35 and the collars 36, and the main valve element 20 is moved to the inner part of the accommodating chamber 78. When a side surface of the main valve element 20 abuts against a stopper 24 with a roller that facilitates vertical movement of the main valve element 20, the movement of the main valve element 20 in a direction perpendicular to the axis of the exhaust flow path 17 stops. The stop position is the accommodated position of the main valve element 20. If the force in the arrow direction F is continuously applied to the propelling shaft 61 in this position, the tension spring 68 stretches because the movement in the direction perpendicular to the axis of the exhaust flow path 17 is no longer allowed. Consequently, the link plates 64 that have been tilted with respect to the propelling shaft 61 rotate so as to extend in a direction perpendicular to the axis of the propelling shaft 61 (parallel to the axis of the exhaust flow path 17). Thus, the state shown in FIG. 4C is reached. The rotation of the link plates 64 causes the L-shaped arm 59 to move toward the pump side (downward in FIGS. 2A and 4A to 4C). This movement is transmitted to the main valve element 20 through the rotating wheel 60, the pivoting arm 45 and the pivot shaft 43. The outer peripheral portion of the main valve element 20 contacts the annular projection 79 to reach the shielded position. Thus, the main valve seal 32 is surrounded by the main valve element 20 the annular projection 79 and the pump-side inner wall surface of the accommodating chamber 78 and hence shielded from harmful components (radicals and plasma) in the exhaust gas. It should be noted that even when the annular projection 79 is not present, the main valve element 20 is pressed against the pump-side inner wall surface of the accommodating chamber 78. Therefore, the pressing surface of the main valve element 20 is shielded from harmful components (radicals and plasma) in the exhaust gas. In the present invention, the main valve element 20 does not perform exhaust flow control. Therefore, the movement of the main valve element 20 from the sealing position to the shielded position is effected rapidly.

In FIG. 2A, when the slats 74A to 74E of the rotary resistance valve elements 70A to 70E are in the respective solid-line positions, approximately the entire cross-sectional area of the exhaust flow path 17 is covered by the slats 74A to 74E. It should be noted that the exhaust flow path 17 need not be hermetically sealed because the pressure in the exhaust flow path 17 is at a medium vacuum level. Even when the main valve element 20 has entered the accommodating chamber 78 to move to the shielded position, the exhaust gas is substantially blocked by the slats 74A to 74E in the solid-line positions. The tilt angle of the slats 74A to 74E is adjusted by moving the compound rack 76, whereby the pressure in the process chamber is controlled, and the flow rate of the exhaust gas is controlled.

To move the main valve element 20 from the position where the main valve seal 32 is shielded to the sealing position, a force is applied to the propelling shaft 61 in a direction opposite to the arrow direction F. Consequently, the main valve element 20 moves parallel to the axis of the exhaust flow path 17 to shift from the position shown in FIG. 4C to the position shown in FIG. 4B. Thus, the main valve element 20 disengages from the annular projection 79. If the force is continuously applied to the propelling shaft 61 in the direction opposite to the arrow direction F, the main valve element 20 moves in a direction perpendicular to the axis of the exhaust flow path 17 from the accommodating chamber 78 toward the exhaust flow path 17. The main valve element 20 stops moving perpendicularly to the axis of the exhaust flow path 17 when the main valve seal 32 of the main valve element 20 is positioned on the same axis as the main valve seat 21. If compressed air is supplied to the head-side cylinder chamber portion of the annular cylinder chamber 33, the piston shafts 35 and the main valve element 20 move toward the main valve seat 21 to reach the sealing position of the main valve element 20, which is shown in FIG. 2A.

Figure 5:
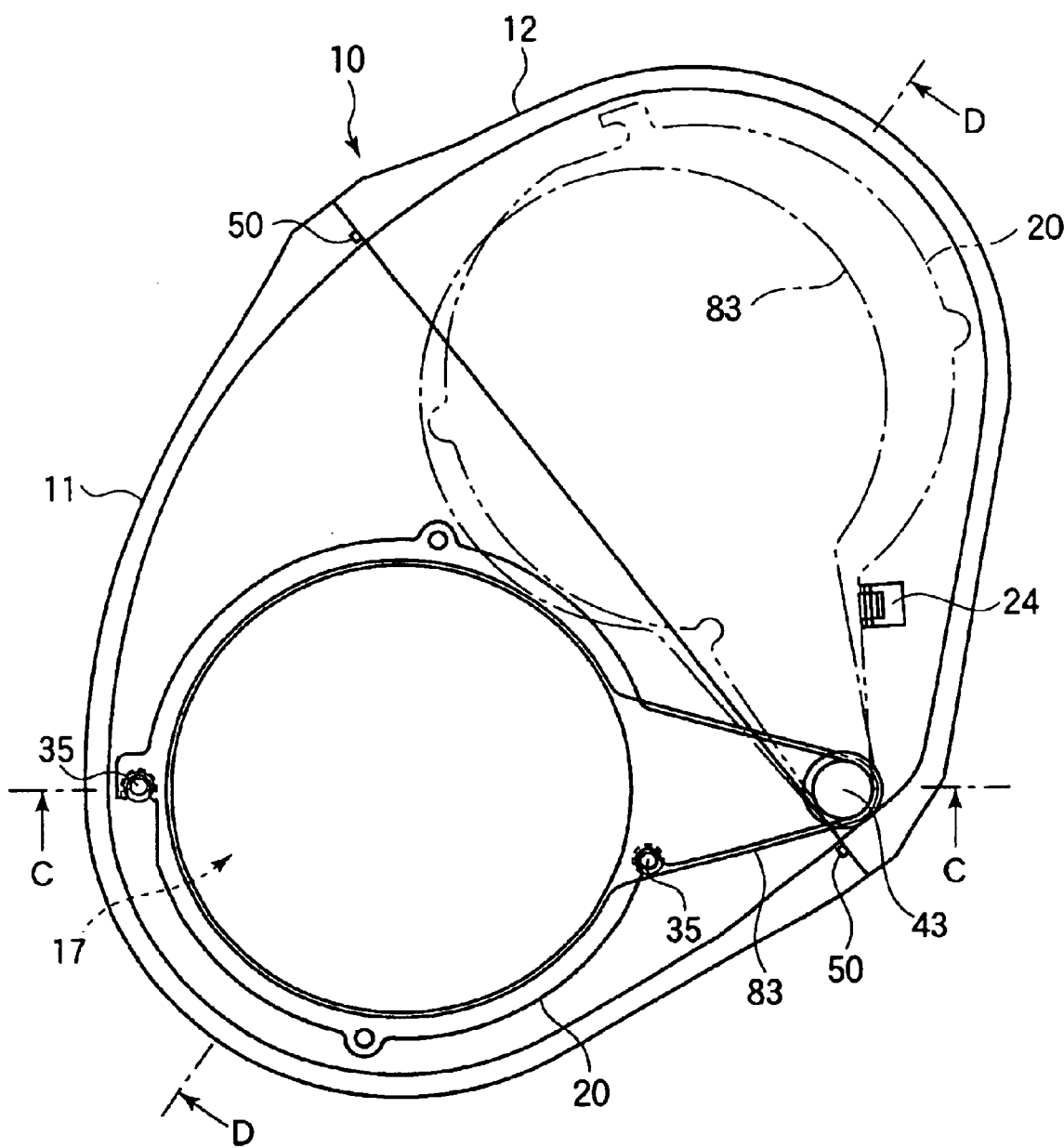
FIG. 5 is a front explanatory view of a gate valve apparatus according to a second embodiment of the present invention.
Figure 7:
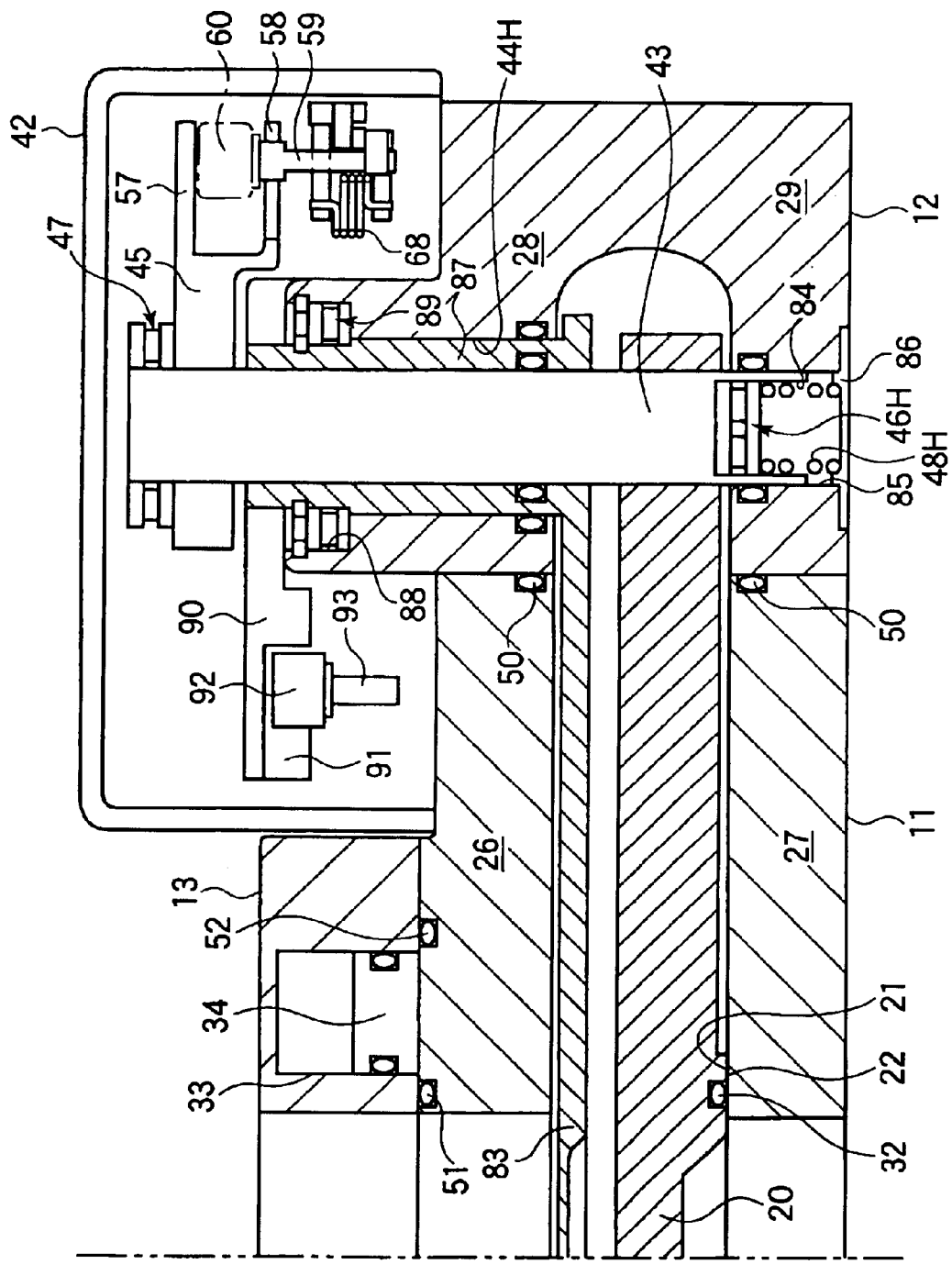
FIG. 7 is a fragmentary enlarged view of an essential part of FIG. 6A.

FIGS. 5 to 7 show a second embodiment of the gate valve apparatus according to the present invention. The first embodiment uses the rotary resistance valve elements 70 as a flow control device, whereas the second embodiment uses a slide resistance valve element 83 as a flow control device. In the second embodiment, the annular cylinder chamber 33 and the spring 48 are disposed at positions different from those in the first embodiment in conformity to the application of the slide resistance valve element 83. However, the principle of moving the main valve element 20 in the second embodiment is the same as in the first embodiment. In the second embodiment, the same members as those in the first embodiment are denoted by the same reference numerals as in the first embodiment, and a description thereof will be omitted or given briefly.

In the second embodiment, the annular cylinder chamber 33 is provided in the flange 13. However, it is also possible to provide the annular cylinder chamber 33 in the side wall 26 of the valve body member 11.

As shown in FIGS. 6A and 7, the valve bonnet 12 has an insertion hole 85 extending through the side wall 29 thereof. The lower end portion of the pivot shaft 43 is inserted into the insertion hole 85. The gap between the insertion hole 85 and the pivot shaft 43 is hermetically sealed with a seal. A blind hole 84 is formed in the pump-side end portion of the pivot shaft 43. A spring retainer 86 is provided at the lower end of the insertion hole 85. A first thrust ball bearing 46H is provided at the bottom of the blind hole 84. A spring 48H is interposed between the first thrust ball bearing 46H and the spring retainer 86.

The flow control device using the slide resistance valve element 83 in the second embodiment will be described below. As shown in FIG. 5 to 7, the slide resistance valve element 83 has a configuration defined by a circular plate with a handle attached thereto. The center of pivotal motion of the slide resistance valve element 83 is located in the handle-shaped portion thereof. A hollow slide shaft 87 is secured to the center of pivotal motion of the slide resistance valve element 83. In the first embodiment, only the pivot shaft 43 is inserted into the insertion hole 44, whereas in the second embodiment, the slide shaft 87 is inserted into the insertion hole 44H, and the pivot shaft 43 is inserted into the bore of the slide shaft 87. The gap between the inner peripheral surface of the insertion hole 44H and the outer peripheral surface of the slide shaft 87 is hermetically sealed with a seal. Similarly, the bore of the slide shaft 87 and the outer peripheral surface of the pivot shaft 43 is hermetically sealed with a seal.

A stepped hole 88 is formed at the chamber-side end (upper end in FIG. 7) of the insertion hole 44H. An annular groove is formed on an outer peripheral portion of the slide shaft 87 that faces opposite the stepped hole 88. A thrust ball bearing 89 is provided in the stepped hole 88. An upper annular support plate of the thrust ball bearing 89 is supported by the annular groove of the slide shaft 87, thereby bearing the load applied to the slide shaft 87. One end portion of a slide arm 90 is secured to the upper end of the slide shaft 87. A guide groove 91 is formed in the other end portion of the slide arm 90. A rotating wheel 92 is engaged in the guide groove 91. The rotating wheel 92 is rotatably supported by an arm 93 through a bearing. If the arm 93 is moved in a direction 25 approximately perpendicular to the plane of FIG. 7, the movement of the arm 93 is transmitted to the slide resistance valve element 83 through the slide arm 90 and the slide shaft 87. Thus, the slide resistance valve element 83 is pivoted.

The operation of the second embodiment will be described below. In the second embodiment, the pivoting arm 45 is secured at a position 180 degrees rotated with respect to that in the first embodiment. Therefore, this point is taken into consideration for the movement of the main valve element 20. When the main valve element 20 is in the sealing position, the upper surface (chamber-side surface) of the outer peripheral portion of the circular plate constituting the slide resistance valve element 83 faces the peripheral edge of the exhaust flow path 17 defined by the lower surface (pump-side surface) of the side wall 26 across a predetermined gap. Thus, the slide resistance valve element 83 closes the exhaust flow path 17. When the main valve element 20 is in the non-sealing position within the accommodating chamber 78, a force is applied to the arm 93 to pivot the slide resistance valve element 83, thereby adjusting the opening of the exhaust flow path 17. Thus, the pressure in the process chamber is controlled, and the flow rate of the exhaust gas is controlled. It should be noted that the rest of the second embodiment is the same as in the first embodiment.

FIGS. 8A and 8B show a modification of the second embodiment of the gate valve apparatus according to the present invention. In the modification of the second embodiment, the same members as those in the second embodiment are denoted by the same reference numerals as in the second embodiment, and a description thereof will be omitted or given briefly. In FIG. 8A, the main valve element 20 that is in the sealing position is illustrated in the left half of the travel space 18. In the right half (accommodating chamber 78) of the travel space 18, the main valve element 20 is illustrated as being in the shielded position. The feature of the modification of the second embodiment is as follows. The main valve element 20 has an annular cut portion 80 or an annular groove 81 (similar to that shown in FIG. 3C) formed on an outer peripheral portion of the abutting surface 22 radially outward of the main valve seal 32. A shielding ring 94 is secured to the annular cut portion 80 or the annular groove 81. When the main valve element 20 is in the sealing position, the shielding ring 94 is positioned in an annular groove 95. In this modification, the annular projection 79 in the second embodiment is eliminated. This feature should also be applied to the first embodiment. It should be noted that deterioration of the main valve seal 32 occurs at the distal end thereof.

As shown in FIGS. 8A and 8B, the annular groove 95 for the shielding ring 94 is formed in the main valve seat 21. When the main valve element 20 is in the sealing position, a downwardly convex projecting portion of the shielding ring 94 is positioned within the annular groove 95 in a non-contact manner, and the main valve seal 32 contacts the main valve seat 21 to seal the exhaust flow path 17. The movement of the main valve element 20 from the sealing position to the position where the main valve seal 32 is shielded is performed in the same way as in the second embodiment. The shielding ring 94 moves together with the main valve element 20. When the main valve element 20 is in the position where the main valve seal 32 is shielded, the distal end (lower end surface in FIGS. 8A and 8B) of the shielding ring 94 abuts against the pump-side inner wall surface of the accommodating chamber 78. Thus, the main valve seal 32 is surrounded by the main valve element 20, the shielding ring 94 and the pump-side inner wall surface of the accommodating chamber 78 without contacting the pump-side inner wall surface, thereby being shielded from radicals and plasma in the exhaust gas.

It should be noted that the present invention is not necessarily limited to the foregoing embodiments but can be modified in a variety of ways without departing from the gist of the present invention.

What is claimed is:

1. A gate valve apparatus comprising:
    a valve body having a rectilinear exhaust flow path formed therein to extend from a chamber port to a pump port; and
    a main valve provided in said valve body, said main valve including a main valve element and a main valve seat, said main valve element being movable within a travel space in a direction parallel to an axis of said exhaust flow path, so that when said main valve element is in a sealing position, a main valve seal for said main valve element contacts said main valve seat to block communication through said exhaust flow path, and when it is in a non-sealing position, said main valve element is separated from said main valve seat by a predetermined distance and moved in a direction perpendicular to the axis of said exhaust flow path so as to be accommodated in an accommodating chamber;
    wherein said main valve seal is provided on an abutting surface of said main valve element, and an annular projection is provided on an inner wall surface of said accommodating chamber, so that when it is in the non-sealing position, said main valve element is moved toward the inner wall surface of said accommodating chamber to bring an outer peripheral portion of said main valve element into contact with said annular projection, whereby said main valve seal is shielded from radicals and plasma in exhaust gas by said main valve element, said annular projection and the inner wall surface of said accommodating chamber.

2. A gate valve apparatus according to claim 1, wherein either one of annular groove and an annular cut portion is formed on an outer peripheral portion of the abutting surface of said main valve element radially outward of said main valve seal, so that said annular projection is fitted into said annular groove or annular cut portion when said main valve seal is in the shielded position.

3. A gate valve apparatus according to claim 1, wherein when said main valve seal is in the shielded position, an outer peripheral surface of said main valve element is fitted to an inner peripheral surface of said annular projection.

4. A gate valve apparatus according to claim 1, wherein when said main valve seal is in the shielded position, an outer peripheral portion of the abutting surface of said main valve element that is radially outward of said main valve seal is abutted against said annular projection.

5. A gate valve apparatus according to claim 1, further comprising:
    a plurality of rotary resistance valve elements having slats on respective rotating shafts that are rotatably provided in said exhaust flow path to extend in a direction perpendicular to the axis of said exhaust flow path, so that a flow rate through said exhaust flow path is controlled by varying an angle of the slats of said rotary resistance valve elements.

6. A gate valve apparatus according to claim 5, wherein said rotating shafts are disposed parallel to each other, and a plurality of pinions are each secured to one end of each of said rotating shafts, said pinions being meshed with a compound rack, some of said pinions being meshed at one side thereof with said compound rack, and the rest of said pinions being meshed at the other side thereof with said compound rack, so that said some of said pinions and the rest of said pinions rotate in opposite directions to each other in response to a reciprocating motion of said compound rack.

7. A gate valve apparatus according to claim 1, further comprising:
    a slide resistance valve element provided in said travel space at a predetermined distance from said main valve element, said slide resistance valve element being movable in a direction perpendicular to the axis of said exhaust flow path, so that a flow rate through said exhaust flow path is controlled by movement of said slide resistance valve element in the direction perpendicular to the axis of said exhaust flow path.

8. A gate valve apparatus according to claim 5 or 6, wherein a heater is installed near the pinions of said rotating shafts to prevent adhesion of a by-product to the slats of said rotary resistance valve elements.

9. A gate valve apparatus according to claim 6, wherein the reciprocating motion of said compound rack is performed by a cylinder device using a metal bellows.

10. A gate valve apparatus according to claim 9, wherein a metal bellows is used as an actuator for moving said slide resistance valve element in the direction perpendicular to the axis of said exhaust flow path.

11. A gate valve apparatus comprising:
    a valve body having a rectilinear exhaust flow path formed therein to extend from a chamber port to a pump port; and a main valve provided in said valve body, said main valve including a main valve element and a main valve seat, said main valve element being movable within a travel space in a direction parallel to an axis of said exhaust flow path, so that when said main valve element is in a sealing position, a main valve seal for said main valve element contacts said main valve seat to block communication through said exhaust flow path, and when it is in a non-sealing position, said main valve element is separated from said main valve seat by a predetermined distance and moved in a direction perpendicular to the axis of said exhaust flow path so as to be accommodated in an accommodating chamber;

wherein said main valve seal is provided on an abutting surface of said main valve element, and a shielding ring is secured to an outer peripheral portion of the abutting surface of said main valve element that is radially outward of said main valve seal, and further an annular groove is formed on said main valve seat, so that when said main valve element is in the sealing position, said shielding ring is positioned in said annular groove, and said main valve seal contacts said main valve seat, and when it is in the non-sealing position, said main valve element is separated from said main valve seat by a predetermined distance and moved toward an inner wall surface of said accommodating chamber to bring said shielding ring into contact with the inner wall surface of said accommodating chamber, whereby said main valve seal is shielded from radicals and plasma in exhaust gas by said main valve element, said shielding ring and the inner wall surface of said accommodating chamber.

12. A gate valve apparatus comprising:

a valve body having a rectilinear exhaust flow path formed therein to extend from a chamber port to a pump port; and a main valve provided in said valve body, said main valve including a main valve element and a main valve seat, said main valve element being movable within a travel space in a direction parallel to an axis of said exhaust flow path, so that when said main valve element is in a sealing position, a main valve seal for said main valve element contacts said main valve seat to block communication through said exhaust flow path, and when it is in a non-sealing position, said main valve element is separated from said main valve seat by a predetermined distance and moved in a direction perpendicular to the axis of said exhaust flow path so as to be accommodated in an accommodating chamber;

wherein said main valve seal is provided on an abutting surface of said main valve element, and when it is in the non-sealing position, said main valve element is moved toward an inner wall surface of said accommodating chamber and further moved in a direction parallel to the axis of said exhaust flow path so as to be pressed against the inner wall surface of said accommodating chamber, whereby a pressing surface of said main valve element is shielded from plasma.

* * * * *